July 24, 1923.
A. T. SLATER
BICYCLE SLED
Filed Nov. 1, 1922
1,462,889
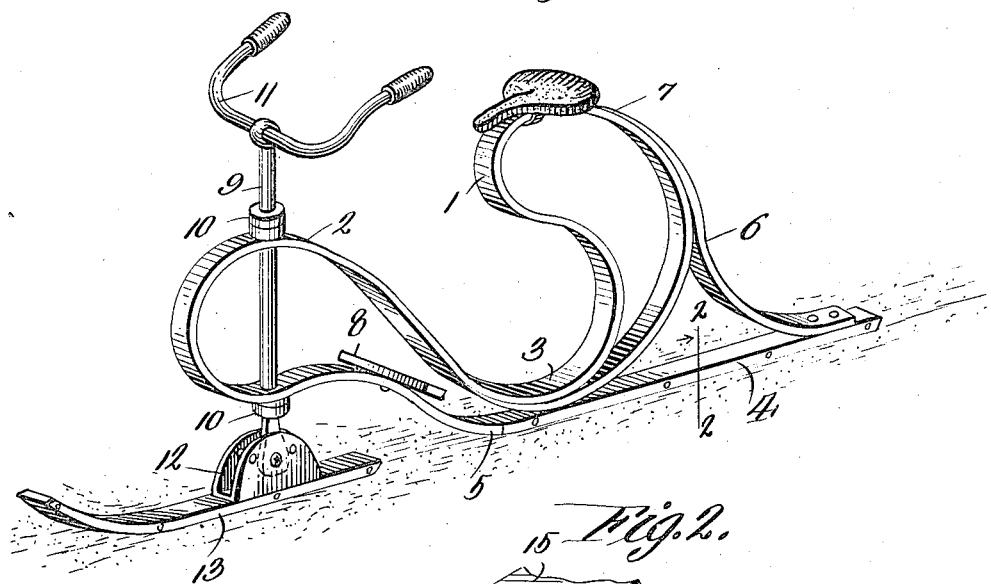
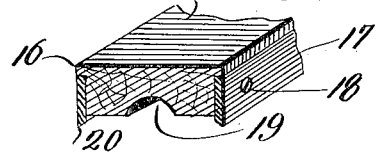
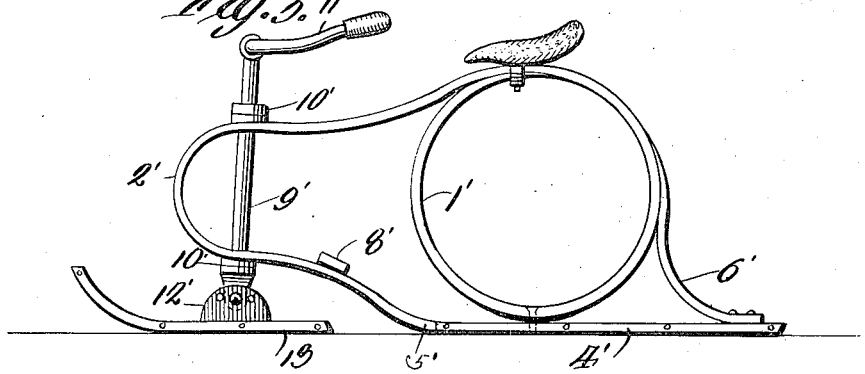
WITNESSES
Guy M Spring
Inventor
A. T. SLATER
By Richard B. Owen
Attorney Patented July 24, 1923.

1,462,889

UNITED STATES PATENT OFFICE.

ADELBERT T. SLATER, OF BAY CITY, MICHIGAN.

BICYCLE SLED.

Application filed November 1, 1922. Serial No. 598,330.

*To all whom it may concern:*

Be it known that ADELBERT T. SLATER, a citizen of the United States, residing at Bay City, in the county of Bay and State of Michigan, have invented certain new and useful Improvements in Bicycle Sleds, of which the following is a specification.

The present invention relates to a bicycle sled or ski and has for its principal object to provide a device of this nature with a body or frame formed from a strand of spring metal. Another important object of the invention is to provide an improved runner for the sled which will prevent skidding thereof.

Still further object of the invention is to provide a device of this nature which will be simple and efficient in construction, reliable in operation, durable, inexpensive to manufacture, attractive in appearance, and well adapted to the purpose for which it is designed.

With the above and numerous other objects in view as will appear as the description progresses, the invention resides in the combination and arrangement of parts as will be hereinafter more fully described and claimed.

In the drawing:—

Figure 1 is a perspective of the device embodying my invention,

Figure 2 is a detailed perspective showing a section through the runner taken substantially on the line 2—2 of Figure 1 looking in the direction of the arrow, and Figure 3 is a side elevation of a modification of the device.

Referring to the drawing in detail, and especially the Figure 1 it will be seen that the frame or body is formed from a single strand of resilient metal that is bent so as to form a rear convolution or coil or loop 1 and a forward loop 2. The intermediate portion between the two loops indicated at 3, rests upon the forward end of the rear runner 4 and the end 5 of the forward loop 2 is connected to the forward end of the rear runner 4. A brace rod 6 formed of spring metal is attached in any suitable manner to the rear loop 1 and its rear end is fixed to the rear end of the rear runner 4. A transversely extending foot-rest 8 is mounted in the forward loop 2. A steering standard 9 is journaled through the forward loop 2 being held in place by the collars 10 on the exterior of this forward loop. Suitable handle bars 11 are attached to the upper end of the steering standard 9 while the lower end thereof is pivotally attached to a U-shaped bracket 12 mounted on the forward runner 13.

Referring to the modification shown in Fig. 3 it will be seen that the frame is constructed from a single strand of resilient metal of suitable material which is provided with a single rear convolution 1' a portion of which extends rearwardly so as to form a brace 6' attached to the rear end of the rear runner 4'. The other end of the convolution 1' extends forwardly so as to form the loop 2' which extends rearwardly and has its ends 5' attached to the forward end of the rear runner 4'. A foot-rest 8' extends transversely of the bottom portion of the loop 2'. A steering standard 9' is journaled through the loop 2' and is held in place by the collars 10'. The handle bars 11' are attached to this steering standard at its upper end while the end of the steering standard is pivotally mounted in the U-shaped bracket 12' of the forward runner 13'.

By referring particularly to Fig. 2 it will be seen that the construction of the runners 4, 4', 13 and 13' is illustrated. Each runner is provided with a body portion 15 preferably formed of wood and having its longitudinal sides partly cut away so as to form shoulders 16 at its upper ends thereof. Metallic plates 17 are fixed to these side portions of the body 15 by the screws 18 or in any other suitable manner as these plates extend beyond the lower face of the body 15 and have their lower edges sharpened as at 20. The bottom face of the bottom 15 is provided with a centrally located longitudinally extending channel 19. The channel 19 and the extending edges of the plate 17 prevents the sled or ski from skidding.

Having thus described my invention, what I claim as new is:—

As a new article of manufacture, a runner for the device of the class described including a body having overhanging shoulders extended along its upper longitudinal edges, plates disposed under the shoulders and extending below the underface of the body said body provided on its underface with a centrally located longitudinally extending channel.

In testimony whereof I affix my signature in presence of two witnesses.

ADELBERT T. SLATER.

Witnesses:
DAVID MILLER,
T. W. THANENPREGER.